(12) United States Patent
Trautenberg

(10) Patent No.: US 9,460,630 B2
(45) Date of Patent: Oct. 4, 2016

(54) METHOD OF AUTOMATICALLY DETERMINING A LANDING RUNWAY

(75) Inventor: Hans L. Trautenberg, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 2212 days.

(21) Appl. No.: 12/502,774

(22) Filed: Jul. 14, 2009

(65) Prior Publication Data

US 2010/0017051 A1    Jan. 21, 2010

(30) Foreign Application Priority Data

Jul. 15, 2008 (DE) ........................ 10 2008 033 235

(51) Int. Cl.
| | | |
|---|---|---|
| G06F 7/00 | (2006.01) | |
| G08G 5/02 | (2006.01) | |
| G01S 1/68 | (2006.01) | |
| G08G 5/00 | (2006.01) | |

(52) U.S. Cl.
CPC ................. *G08G 5/025* (2013.01); *G01S 1/68* (2013.01); *G08G 5/0026* (2013.01)

(58) Field of Classification Search
CPC ........................................................ G01S 1/68
USPC ...... 701/3, 4, 5, 14, 18, 120, 122; 73/178 T;
340/947, 951, 952, 953, 954, 955, 956,
340/957, 972
See application file for complete search history.

(56) References Cited

U.S. PATENT DOCUMENTS

| | | | | |
|---|---|---|---|---|
| 3,261,017 A | * | 7/1966 | Luftig ........................... 342/465 |
| 3,624,598 A | * | 11/1971 | Foster ........................... 340/957 |
| 4,103,300 A | * | 7/1978 | Gendreu et al. ................. 342/33 |
| 5,017,930 A | * | 5/1991 | Stoltz et al. ................... 342/465 |
| 5,343,395 A | * | 8/1994 | Watts ............................... 701/16 |
| 5,523,949 A | * | 6/1996 | Agate et al. ..................... 701/17 |
| 5,600,329 A | * | 2/1997 | Brenner ..................... 342/357.44 |
| 5,712,785 A | * | 1/1998 | Mok et al. ....................... 701/16 |
| 5,748,136 A | * | 5/1998 | Fischer ............................ 342/33 |
| 5,820,080 A | | 10/1998 | Eschenbach |
| 6,304,800 B1 | * | 10/2001 | Ishihara et al. ................. 701/16 |
| 6,690,296 B2 | * | 2/2004 | Corwin et al. ................. 340/961 |
| 6,809,679 B2 | * | 10/2004 | LaFrey et al. .................. 342/37 |
| 7,079,951 B2 | * | 7/2006 | Conner et al. ................. 701/301 |
| 7,286,077 B2 | * | 10/2007 | Falcati et al. ................... 342/33 |

(Continued)

FOREIGN PATENT DOCUMENTS

| | | |
|---|---|---|
| DE | 36 44 478 A1 | 7/1988 |
| EP | 0 273 326 A2 | 7/1988 |
| WO | WO 94/10582 A1 | 5/1994 |

OTHER PUBLICATIONS

Wikipedia, "Instrument Landing System," en.wikipedia.org, Mar. 28, 2006. [Online]. Available: http://web.archive.org/web/20060328225523/http://en.wikipedia.org/wiki/Instrument_landing_system. [Accessed Jul. 23, 2012].*

(Continued)

*Primary Examiner* — Thomas G Black
*Assistant Examiner* — Peter D Nolan
(74) *Attorney, Agent, or Firm* — Crowell & Moring LLP

(57) ABSTRACT

A method of automatically determining a landing runway for an aircraft includes the steps of i) determining control points assigned to a landing runway along a landing approach of an airplane; ii) determining the spatial deviation of the airplane from the determined control points; and iii) determining an appropriate landing runway while taking into account the determined spatial deviation.

12 Claims, 3 Drawing Sheets

(56) References Cited

U.S. PATENT DOCUMENTS

| | | | |
|---|---|---|---|
| 7,382,287 B1* | 6/2008 | Chen et al. | 340/972 |
| 7,715,955 B2* | 5/2010 | Tatham et al. | 701/16 |
| 7,797,086 B2* | 9/2010 | Lorido et al. | 701/16 |
| 7,898,467 B2* | 3/2011 | Rambach et al. | 342/169 |
| 8,035,547 B1* | 10/2011 | Flanigan et al. | 342/36 |
| 2005/0234592 A1* | 10/2005 | McGee et al. | 700/245 |
| 2007/0010921 A1* | 1/2007 | Ishihara et al. | 701/16 |
| 2007/0129857 A1 | 6/2007 | Fortier | |
| 2007/0142982 A1 | 6/2007 | Lorido et al. | |

OTHER PUBLICATIONS

Corresponding European Search Report with English Translation dated Jul. 4, 2011 (ten(10) pages).

* cited by examiner

METHOD OF AUTOMATICALLY DETERMINING A LANDING RUNWAY

BACKGROUND AND SUMMARY OF THE INVENTION

This application claims the priority of German patent document 102008033235.6-56, filed Jul. 15, 2008, the disclosure of which is expressly incorporated by reference herein.

The invention relates to a method for automatically determining a landing runway for an aircraft.

It is a frequent occurrence that airplanes approach the wrong landing runway at an airport. This happens not only when the visibility is poor but frequently also when there is good visibility. In some cases, although airplanes approach the correct landing runway, they do so from the wrong direction. Both situations (approaching the wrong landing runway and approaching the correct landing runway from the wrong direction) may result in dangerous situations, particularly in the case of airports with high air traffic density.

Published U.S. Patent Application No. 2007/0142982 A1 discloses a method for determining the touch-down spot of an airplane on a landing runway. In this case, the touch-down point is calculated based on information concerning the situation in the airplane and the intentions of the crew, and based also on information concerning the configuration of the landing runway. For this purpose, a computer onboard an airplane correlates these two types of information in order to determine the runway on which the airplane is to land, and particularly the touch-down point of the airplane thereon. Although this method permits the determination of the correct landing runway, it cannot prevent an airplane from approaching the landing runway from the wrong direction. Therefore, certain dangerous situations cannot be prevented because air space intended for an approach to a different landing runway can be used by the airplane for approaching the landing runway.

It is therefore an object of the present invention to provide a method for automatically determining a landing runway which, in particular, can help to avoiding dangerous situations in the air space.

This and other objects and advantages are achieved by the method according to the invention, in which the prediction of the touch-down point of an airplane on the landing runway according to Published U.S. Patent Application No. 2007/0142982 A1 is no longer used to determine the landing runway. Rather, the spatial deviation of the aircraft relative to several control points along the landing approach suitable (and open) for the weather situation and prediction of the touch-down point, are used for this purpose. In this manner, it can be assured not only that the correct landing runway will be used, but also that the flight to the landing runway takes place along the correct path, thereby further improving the safety of the landing approach, especially in the case of high-traffic airports.

One embodiment of the invention provides a method having the following steps:
  determining control points assigned to a landing runway along a landing approach of an airplane,
  determining the spatial deviation of the airplane from the determined control points,
  determining an appropriate landing runway, taking into account the determined spatial deviation; and
  causing the airplane to land on the determined landing runway.

By identifying the control points and the spatial deviation of the airplane from them, the position of the airplane can be determined automatically with respect to a landing runway to which the control points are assigned. In this case, the control points, in principle, define the correct approach path of a landing runway. This, in turn, permits the automatic determination of an appropriate landing runway, because it can be determined rapidly how the airplane is positioned relative to the landing runway, including in particular the direction from which it is approaching the landing runway. Here, an appropriate landing runway is the one landing runway that is approached from the correct direction.

According to an embodiment of the invention, the determination of the spatial deviation of the airplane from the determined control points may include an evaluation of the meeting of the control points, using one or more of the following parameters: location, speed, angle of approach and vertical rate of descent of the airplane. A certain location in the form of coordinates in three-dimensional space may be assigned to each control point. The precision with which a control point is met can be determined by comparing the actual airplane coordinates with the coordinates assigned to the control point. In addition, further parameters, such as an optimal airplane speed, an optimal angle of approach and an optimal vertical descent may be assigned to a control point. All these parameters may also be compared with the actual flight data of the airplane in order to determine the precision with which a control point has been "met" by an approaching airplane.

According to an another feature of the invention, as the distance to a landing runway decreases, the control points can be set at increasingly shorter distances, so that the evaluation of the meeting of the control points can be carried out with increasing precision. As a result, determination of a suitable landing runway can be intensified mainly in direct proximity of the landing runway, so as to be able to determine as reliably as possible in this critical and accident-endangered zone, whether the correct landing runway is approached from the correct direction.

Furthermore, according to still another feature of an embodiment of the invention, the determination of an appropriate landing runway, taking into account the determined spatial deviation, may further comprise the evaluation of landing approach paths three-dimensionally stored in a databank, with the selection of an appropriate landing runway being made as a function thereof. For example, by means of the determined spatial deviation, an appropriate landing approach path can be determined, stored in the databank, and indicated to a pilot in a display, whereby the determination of an appropriate landing runway can be significantly simplified for the pilot.

In addition, user input can also be taken into account when selecting a suitable landing runway. For example, different landing runways appropriate for an airplane during a landing approach may be offered for selection by the pilot, who can then chose a landing runway.

The invention also includes a computer program for the implementation of the method according to the invention, as well as a computer program product, which comprises a machine-readable program carrier on which a computer program according to the invention is stored in the form of electronically and/or optically readable control signals.

Finally, the invention provides a device for automatically determining a landing runway, which device is equipped for implementing the method according to the invention as described above, and is constructed for operation in an airplane. The device may be constructed, for example, as an independent unit to be used in the cockpit of an airplane. The unit may also be constructed as a mobile device; and a special purpose computer is conceivable, which can be carried along comfortably in the airplane by the flight crew. As an alternative, the device may also be fixedly installed in the cockpit of an airplane in order to thereby ensure improved safety, particularly for the critical landing approach.

In particular, according to an embodiment of the invention, the device may be constructed to receive signals of control points for example, via corresponding receiving devices, such as optical or radio receivers.

Other objects, advantages and novel features of the present invention will become apparent from the following detailed description of the invention when considered in conjunction with the accompanying drawings.

BRIEF DESCRIPTION OF THE DRAWINGS

The terms used in the attached list of reference symbols and the assigned reference symbols are used in the description, the claims, the abstract and the drawings.

DETAILED DESCRIPTION OF THE DRAWINGS

In the following, identical and/or functionally identical elements have the same reference symbols.

Figure 1:
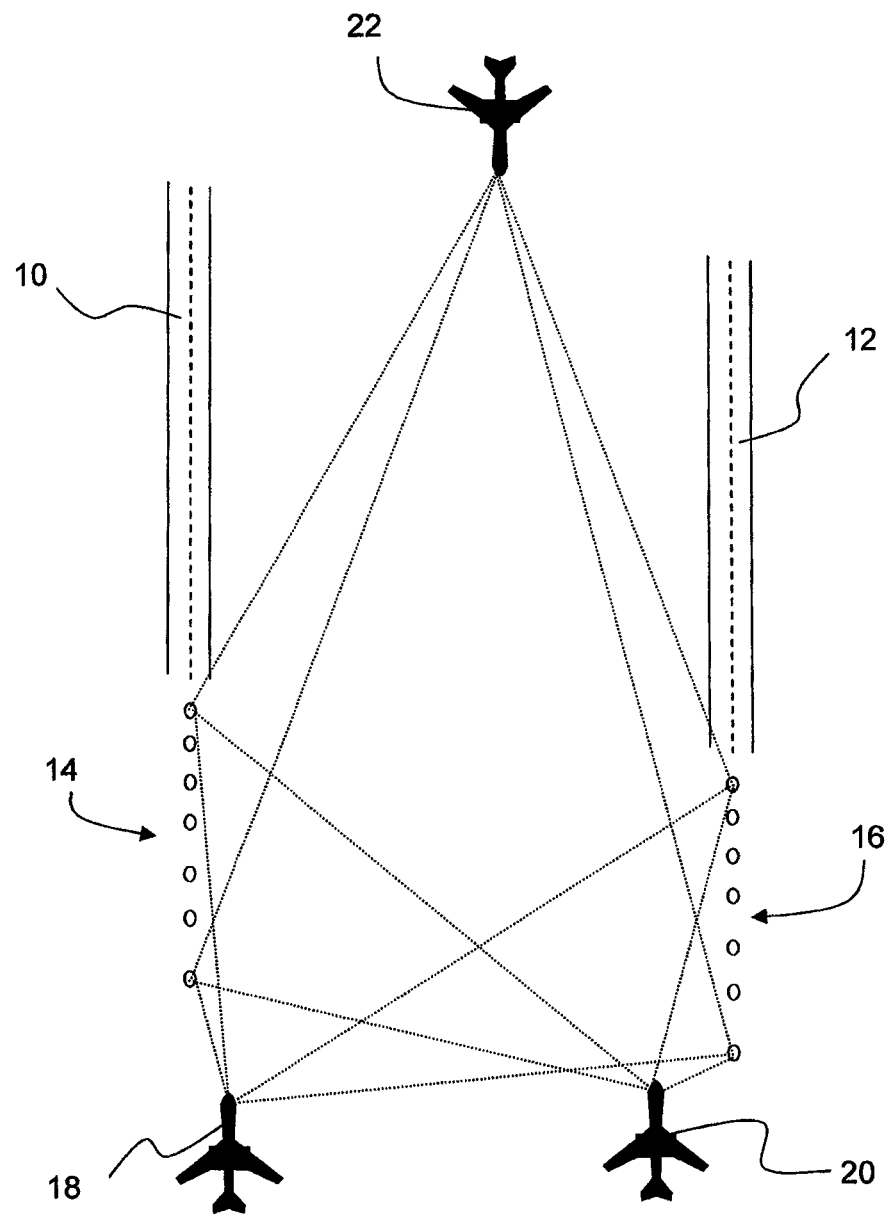
FIG. 1 is a view of an aircraft approaching landing runways, with control points according to the invention being assigned to the landing runways.

FIG. 1 is a top view of a situation in which two landing runways 10 and 12 of an airport, which extend almost parallel side-by-side, are approached by various planes 18, 20 and 22 from different directions. Control points 14 and 16 are assigned to respectively the two landing runways 14 and 16. In principle, the control points 14 and 16 extend the landing runways 10 and 12 and are spaced away from one another on straight lines in such a manner that, as the distance to the landing runway decreases, the spacing of the control points also decreases. Thus, at a shorter distance to the landing runway, an airplane approaching a landing runway can continuously more precisely determine its spatial deviation from the landing runway or from the approach path onto the landing runway.

Figure 2:
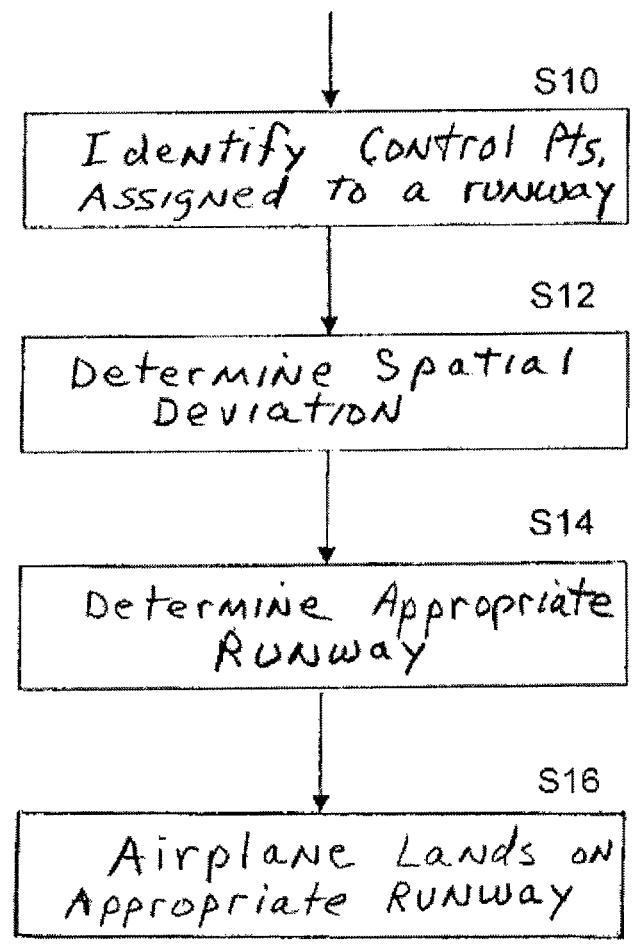
FIG. 2 is a flow chart of a method for automatically determining a landing runway and landing an airplane, according to an embodiment of the invention.

FIG. 2 outlines the essential steps of a method for automatically determining a landing runway.

First, in Step S10 the respective control points 14 and 16 assigned to a landing runway 10 or 12 are identified along a landing approach of an airplane 18 and 20 and 22 respectively. The control points 14 and 16 may, for example, be constructed as radio signal transmitters which continuously emit radio signals for identification (shown by the dotted lines). The control points may also emit optical signals for identification. It is essential that an approaching airplane 18, 20 and 22 can rapidly and reliably determine the control points.

In the next Step S12, it is determined by means of the determined control points, how far the corresponding airplane is away from each of the control points; that is, how large the spatial deviation of the airplane is from the control points. The determination of the spatial deviation can take place, for example, in that a signal of a control point contains its coordinates in space and an airplane receiving the signal determines its spatial deviation from the control point by means of its coordinates. The determination of the spatial deviation may also comprise an evaluation of the meeting of the control points. For evaluating the meeting of a control point, the location, speed, angle of approach and/or vertical downward component of velocity (descent rate) of the air plane can be used as parameters.

An appropriate landing runway for landing the airplane is then determined in Step S14, taking into account the determined spatial deviation of an airplane from determined control points. In the situation illustrated in FIG. 1, for example, by means of the slight spatial deviation of the airplane 18 from the control points 14, the landing runway 10 is determined to be an appropriate runway. Analogously, the landing runway 12 is determined to be the appropriate runway for the airplane 20. Neither of the two landing runways 10 and 12, however, is determined to be appropriate for airplane 22 approaching the landing runways from the wrong direction, because of the considerable spatial deviation from control points 14 and 16. As a result, the pilot of airplane 22 knows that none of the landing runways 10 and 12 is appropriate for his landing approach and that he is approaching the landing runways from the wrong direction. This can, for example, be visually or acoustically signaled to the pilot in the cockpit of the airplane 22.

Finally, in Step S16, the airplane is controlled to land on the selected runway.

When determining an appropriate landing runway, landing approach paths of the landing runways 10 and 12 three-dimensionally stored in a databank may also be evaluated. For example, the spatial deviation from the control points 14 and 16 can also be determined for airplane 18. Subsequently, the three-dimensionally stored landing approach paths for each of the two landing runways 10 and 12 can also be read out of the databank in the airplane. Finally, by means of these precise data of the landing approach paths, landing runway 10 can be determined to be the appropriate landing runway for airplane 18. The additional evaluation of the three-dimensionally stored landing approach paths permits a still better determination of a suitable landing runway than a determination by only taking into account the determined spatial deviation.

Figure 3:
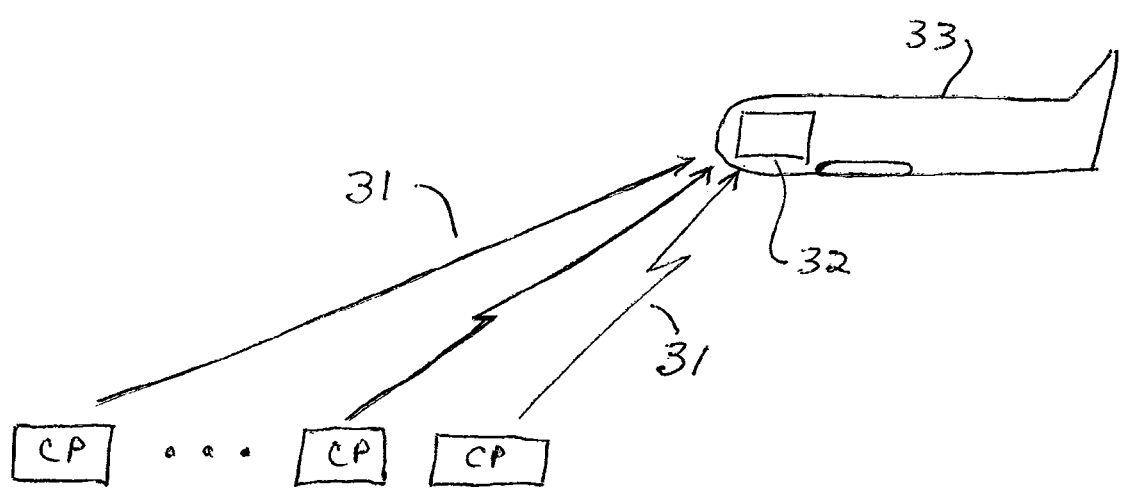
FIG. 3 is a schematic depiction of the apparatus according to the invention.

FIG. 3 illustrates a device for controlling landing of an airplane according to the invention, in which a plurality of control points CP (only three of which are shown, for simplicity, continuously transmit identification signals 31, which are received by the device 32 according to the invention, which may for example be situated in an aircraft 33. The device 32 may be either a special purpose computer or a programmed general purpose processor. The device 32 identifies the respective control points and extracts their location data from the received signals. It then determines the deviation of the aircraft from the respective control points, selects an appropriate runway for landing the aircraft, and outputs a signal 33A for operation of the aircraft to land on the selected runway.

The invention permits the determination of a suitable landing runway by a plane, particularly as to whether the landing runway is approached from the correct direction. In contrast, in Published U.S. Patent Application No. US2007/014298 A1, although it is possible to ensure that the correct landing runway is used by an airplane by selecting the touch-down point on the runway as the decision criterion for a landing runway, it does not ensure that the landing runway is approached from the correct direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS 10, 12 Landing runway
14, 16 Control points of landing runways 10 and 12, respectively
18, 20, 22 airplane
S10-S14
CP control points
31 identification signals
32 selection device
33 airplane

What is claimed is:

1. Method of automatically determining a landing runway, said method comprising:
   identifying control points situated along a landing approach of an airplane to each of a plurality of landing runways;
   determining a spatial deviation and an approach direction of the airplane from each of the identified control points; and
   determining an appropriate landing runway based on the determined spatial deviation and the determined approach direction.

2. The method according to claim 1, wherein said step of determining the spatial deviation of the airplane from the control points comprises an evaluation based on at least one of the parameters location, speed, angle of approach and vertical rate of descent of the airplane.

3. The method according to claim 2, wherein the control points are set at increasingly shorter distances from each other as the distance to a landing runway decreases.

4. The method according to claim 1, wherein, the step of determining an appropriate landing runway comprises:
   evaluating landing approach paths that are three-dimensionally stored in a databank, based on the determined spatial deviation;
   selecting an appropriate landing runway as a function thereof.

5. The method according to claim 4, wherein user input is also taken into account when selecting an appropriate landing runway.

6. A computer program product comprising a machine-readable, non-transitory program carrier encoded with a computer program which, when operated on a general purpose data processor, causes the computer program to perform the steps of:
   identifying control points situated along a landing approach of an airplane to each of a plurality of landing runways;
   determining a spatial deviation and an approach direction of the airplane from the determined control points; and
   determining an appropriate landing runway based on the determined spatial deviation and the determined approach direction.

7. A method for controlling landing an aircraft on a landing runway selected from among a plurality of runways, each of which has a set of control points situated at known locations along a landing approach thereto; said method comprising:
   receiving identification signals transmitted continuously from the control points in each of said sets of control points;
   based on said received identification signals, determining respective spatial deviations and approach directions of the aircraft from each of said control points;
   selecting a runway for landing said aircraft based on said determined spatial deviations and the determined approach directions; and
   causing said aircraft to land on the selected runway.

8. The method according to claim 7, wherein said step of determining a spatial deviation comprises:
   determining three dimensional coordinates of the respective control points based on information contained in said identification signals; and
   comparing actual current airplane position coordinates with the determined three dimensional coordinates of said control points.

9. The method according to claim 8, further comprising:
   comparing stored optimal values for at least one of airplane speed, approach azimuth, and vertical descent rate for each runway, with actual flight data for the airplane.

10. The method according to claim 8, further comprising:
    evaluation of three dimensional landing approach paths stored in a databank; and
    displaying information regarding a selected landing approach path to an operator of said airplane.

11. The method according to claim 7, wherein spacing between said control points along said landing approaches decreases with increasing proximity to the associated runway.

12. A system for controlling landing of an aircraft on a runway selected from among a plurality of runways, said system comprising:
    a plurality of control points situated along a landing approach to each of said runways, each of said control points continuously transmitting an identification signal containing its spatial location;
    a device which is situated on board said aircraft and receives said identification signals; wherein,
    said device comprises one of a special purpose computer and a programmed general purpose computer;
    based on said received identification signals, said device determines spatial deviations and approach directions of the aircraft from the respective control points, and selects a runway for landing said aircraft, based on said determined spatial deviations and the determined approach directions; and
    said device generates an output for landing said aircraft on the selected runway.

* * * * *